(12) United States Patent
Murphy

(10) Patent No.: US 11,860,399 B2
(45) Date of Patent: Jan. 2, 2024

(54) DEVICES CONTAINING A REMOTE PHOSPHOR PACKAGE WITH RED LINE EMITTING PHOSPHORS AND GREEN EMITTING QUANTUM DOTS

(71) Applicant: CURRENT LIGHTING SOLUTIONS, LLC, East Cleveland, OH (US)

(72) Inventor: James Edward Murphy, Niskayuna, NY (US)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 0 days.

(21) Appl. No.: 16/936,968

(22) Filed: Jul. 23, 2020

(65) Prior Publication Data

US 2020/0355864 A1 Nov. 12, 2020

Related U.S. Application Data

(63) Continuation of application No. 15/370,762, filed on Dec. 6, 2016, now Pat. No. 10,754,081.

(Continued)

(51) Int. Cl.
*G02B 6/00* (2006.01)
*C09K 11/61* (2006.01)
(Continued)

(52) U.S. Cl.
CPC ......... *G02B 6/005* (2013.01); *G02B 6/0023* (2013.01); *G02F 1/133615* (2013.01); *C09K 11/617* (2013.01); *G02F 2202/36* (2013.01)

(58) Field of Classification Search
CPC .... G02B 6/005; G02B 6/0023; C09K 11/616; C09K 11/617
See application file for complete search history.

(56) References Cited

U.S. PATENT DOCUMENTS

| 7,358,542 B2 | 4/2008 | Radkov et al. |
| 7,497,973 B2 | 3/2009 | Radkov et al. |

(Continued)

FOREIGN PATENT DOCUMENTS

| KR | 10-2015-0133780 A | 11/2015 |
| KR | 10-2017-0118173 A | 10/2017 |
| WO | 2016/186636 A1 | 11/2016 |

OTHER PUBLICATIONS

American Polarizers Inc. 3M Brightness Enhancement Films (BEF). Retrieved from: https://www.apioptics.com/product-category/products/3m-surface-display-enhancement-films/3m-brightness-enhancement-films-bef/ Retrieved on May 28, 2021.*

(Continued)

*Primary Examiner* — Matthew E. Hoban
(74) *Attorney, Agent, or Firm* — Buckley, Maschoff & Talwalkar LLC

(57) ABSTRACT

A remote phosphor package according to the present invention includes a green emitting quantum dot material and a $Mn^{4+}$ doped phosphor of formula I, dispersed in a host matrix $$A_x[MF_y]:Mn^{4+} \quad \text{I}$$

wherein
A is Li, Na, K, Rb, Cs, or combinations thereof;
M is Si, Ge, Sn, Ti, Zr, Al, Ga, In, Sc, Y, La, Nb, Ta, Bi, Gd, or combinations thereof;
x is an absolute value of a charge of the $[MF_y]$ ion; and
y is 5, 6 or 7.

20 Claims, 2 Drawing Sheets

Related U.S. Application Data

(60) Provisional application No. 62/304,572, filed on Mar. 7, 2016.

(51) Int. Cl.
  *F21V 8/00* (2006.01)
  *G02F 1/13357* (2006.01)

(56) References Cited

U.S. PATENT DOCUMENTS

| | | | |
|---|---|---|---|
| 7,648,649 B2 | 1/2010 | Radkov et al. | |
| 2008/0055881 A1* | 3/2008 | O'Neill | G02B 5/0257 359/485.02 |
| 2012/0113672 A1* | 5/2012 | Dubrow | G02B 6/0055 977/774 |
| 2013/0335677 A1 | 12/2013 | You | |
| 2016/0020366 A1* | 1/2016 | Hwang | G01J 1/42 438/16 |
| 2016/0093776 A1 | 3/2016 | Setlur et al. | |
| 2016/0160122 A1* | 6/2016 | You | C09K 11/025 252/301.36 |
| 2016/0312114 A1 | 10/2016 | Murphy et al. | |
| 2017/0125650 A1* | 5/2017 | Pickett | C09K 11/02 |

OTHER PUBLICATIONS

International Search Report and Written Opinion issued in connection with corresponding PCT Application No. PCT/US2017/027209 dated Dec. 14, 2017.

"Nanoco says commissioning of Koren LCD plant under way," Retreived from the internet URL: http://en.ofweek.com/new-products/Nanoco-says-commissioning-of-Koren-LCD-plant-under-way-31443, on May 17, 2018, pp. 1-5(Jul. 02, 2015).

Neikirk, L., "Samsung KS9500 Series 4K TV First Impressions Review," Retreived from the Internet URL: http://televisions.reviewed.com/content/samsung-ks9500-series-4k-suhd-tv-first-impressions-review, on May 14, 2018, pp. 1-4(Jan. 9, 2016).

"Quantum dots increasingly important in displays," Retreived from the internet URL: http://en.ofweek.com/news/Quantum dots-increasingly important-in-displays-says-analyst-35740, on May 17, 2018, pp. 1-6(Oct. 30, 2015).

Singleton, M., "Sharp TVs are coming back to the US with Quantum Dot and HDR," The Verge, Retreived from the Internet URL: https://www.theverge.com/2016/1/6/10709348/sharp-hisense-television-hdr-US-ces-2016, on May 14, 2018, pp. 1-3(Jan. 6, 2016).

Sullivan, S.C., et al., "Quantum Dots for LED Downconversion in Display Applications," ECS Journal of solid state science and technology, vol. 2, Issue 2, pp. R3026-R3030(2013).

Takahashi, D., "Samsung unveils new lineup of SUHD TVs with quantum dot displays," Retreived from the internet URL: http://venturebeat.com/2016/01/05/samsung-unveils-new-line-up-of-suhd-tvs-with-quantum-dot-displays, on May 17, 2018, pp. 1-14(Jan. 5, 2016).

"LCD Monitor Teardown," Retreived from the internet URL: https://www.youtube.com/watch?v=jiejNAUwcQ8, on May 17, 2018, pp. 1-3(Mar. 16, 2012).

Office Action dated Apr. 22, 2021 which was issued in connection with Korean Application No. 10-2019-7033447 which was filed on Apr. 12, 2017.

* cited by examiner

DEVICES CONTAINING A REMOTE PHOSPHOR PACKAGE WITH RED LINE EMITTING PHOSPHORS AND GREEN EMITTING QUANTUM DOTS

CROSS-REFERENCE TO RELATED APPLICATIONS

This application is a continuation of U.S. patent application Ser. No. 15/370,762, filed Dec. 6, 2016, now U.S. Pat. No. 10,754,081, which claims priority to U.S. provisional application, Ser. No. 62/304,572, filed Mar. 7, 2016, the entire disclosures of which are incorporated herein by reference in their entirety.

BACKGROUND

Energy efficiency is a critical feature in the field of consumer electronics, and displays consume a large portion of device power. Display power consumption highly affects many features of electronic display devices, including battery requirements in mobile display applications, as well as device operating temperature and panel lifetime, especially in large display applications. In conventional display devices, a majority of the energy consumed by the device is dedicated to the display, particularly the display backlight unit. Conventional phosphors exhibit broad emission spectra, so a large amount of the light produced is filtered out by color filters to produce sharper color components. This broad spectrum filtering results in wasted light energy, decreased brightness, and higher display operating temperatures. Therefore, improvements in color gamut and brightness are desirable.

BRIEF DESCRIPTION

It has been discovered that backlight units including a remote phosphor package according to the present invention exhibit efficiency improvements over conventional display backlight units due to the efficient use of primary light, resulting in a reduction in wasted light energy. The remote phosphor package includes a green emitting quantum dot material and a $Mn^{4+}$ doped phosphor of formula I, dispersed in a host matrix

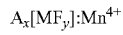

$$A_x[MF_y]:Mn^{4+} \qquad I$$

wherein
A is Li, Na, K, Rb, Cs, or combinations thereof;
M is Si, Ge, Sn, Ti, Zr, Al, Ga, In, Sc, Y, La, Nb, Ta, Bi, Gd, or combinations thereof;
x is an absolute value of a charge of the $[MF_y]$ ion; and
y is 5, 6 or 7.

DETAILED DESCRIPTION

Figure 1A:
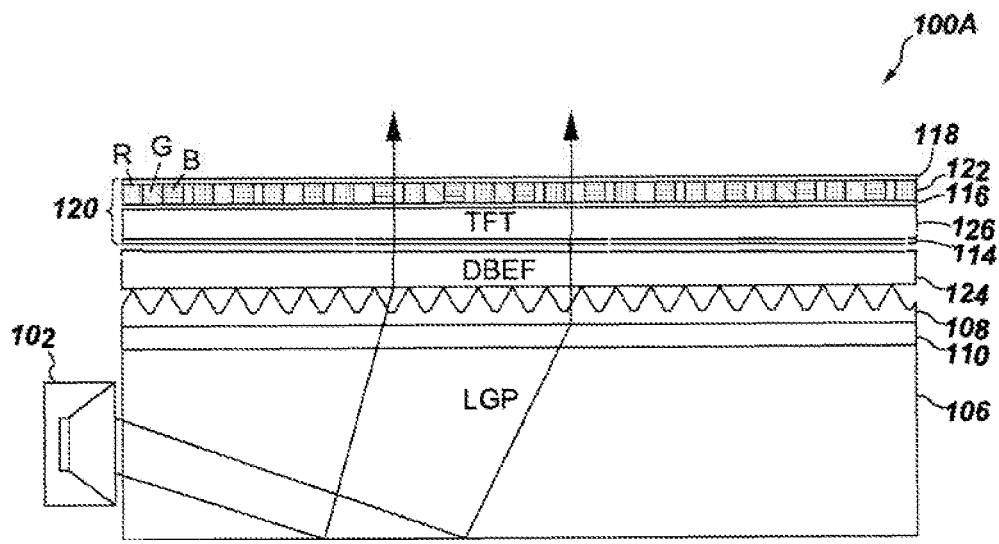
FIG. 1A illustrates a conventional liquid crystal display (LCD) with an edge lit backlight configuration.

FIG. 1A illustrates a conventional liquid crystal display (LCD) with an edge lit backlight configuration. LCD 100A includes a primary light source or backlight source 102, light guide panel 106, and a LCD panel 120. The LCD 100 uses the LCD panel 120 with control electronics and the backlight source 102 to produce color images. The backlight source 102 provides white light.

The liquid crystal display panel 120 includes color filters 122 arranged in subpixels, such as a red color filter, a green color filter, and a blue color filter. The red, green, and blue filters 122 transmit a light having a specific wavelength of white light incident from the backlight source 102. The filters 122 transmit wavelengths of light corresponding to the color of each filter, and absorb other wavelengths.

The LCD panel 120 also includes a front polarizer 118, a rear polarizer 114, a thin film transistor 126, and liquid crystal 116 as well as electrodes (not shown). The color filters 122 are positioned between the liquid crystal 116 and the front polarizer 118. The thin film transistor 126 is positioned between the liquid crystal 116 and the rear polarizer 114. Each pixel has a corresponding transistor or switch for controlling voltage applied to the liquid crystal 116. The front and rear polarizers 118 and 114 may be set at right angles. Normally, the LCD panel 120 is opaque. When a voltage is applied across the liquid crystal 116, the rod-shaped polymers align with the electric field and untwist such that the voltage controls the light output from the front polarizer 118. For example, when a voltage is applied to the liquid crystal 116, the liquid crystal 116 rotates so that there is a light output from the front polarizer 118.

Backlight source 102 includes one or more blue LEDs and yellow phosphor pumped by the blue LEDs to emit white light for LCD 100. The white light from the backlight source 102 travels toward light guide panel 106, through diffuser film 110 and prism 108 as well as double brightness enhanced film 124, which provides a uniform light backlight for the liquid crystal display panel 120. Alternatively, the backlight source 102 may include a white LED that provides white light to the light guide panel 106. The white LED may use a blue LED with broad spectrum yellow phosphor, or a blue LED with red and green phosphors.

Figure 1B:
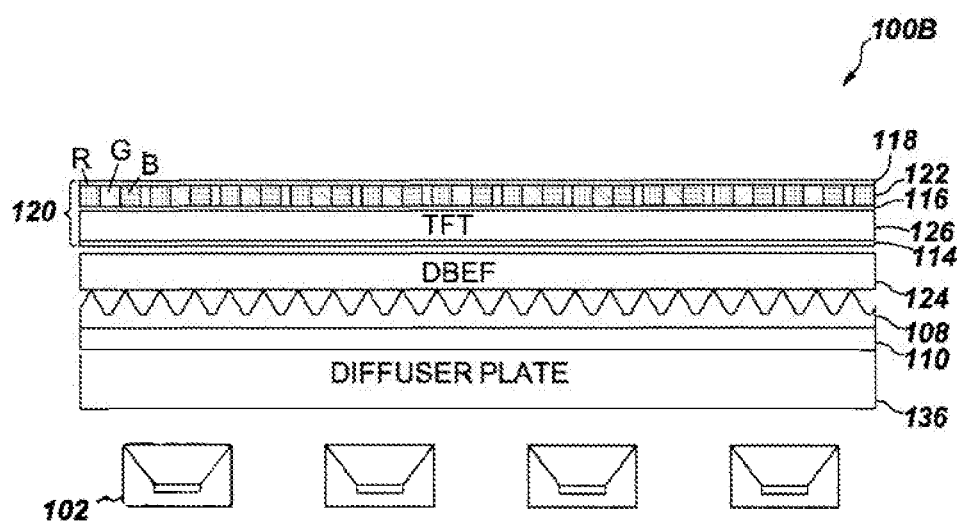
FIG. 1B illustrates a direct lit backlight configuration for the conventional LCD.

FIG. 1B illustrates a direct lit backlight configuration for the conventional LCD. As shown, the main differences from the edge lit configuration 100B include different arrangement of a number of LEDs and absence of light guide panel 106. More specifically, the LEDs 102 are arranged to directly provide light to a diffuser plate 126, which is normally thicker than the diffuser film 110 and thus supports the diffuser film 110.

Figure 2:
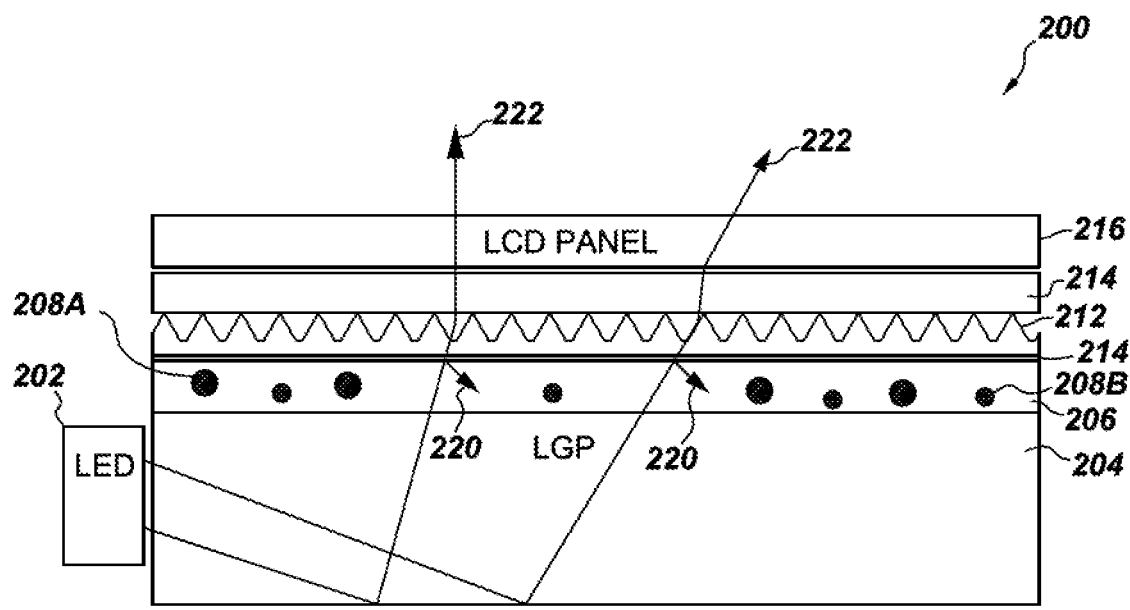
FIG. 2 illustrates a backlight unit or module 200 according to the present invention.

FIG. 2 illustrates a backlight unit or module 200 according to the present invention that includes light source 202, light guide panel 204, remote phosphor package 206, dichroic filter 210, and LCD panel 216. Backlight unit 200 may also optionally include a prism 212 and a double brightness enhanced film 214. The light source 202 is a blue emitting LED. To produce even lighting, blue light from the light source 202 first passes through light guide panel 204 which diffuses the blue light. The LCD panel 216 also includes color filters arranged in subpixels, a front polarizer, a rear polarizer, and liquid crystal as well as electrodes, similar to the LCD panel 120 for the conventional LCD 100. Generally, there is an air space between the LCD panel 216 and the double brightness enhanced film 214. The double brightness enhanced film 214 is a reflective polarizer film which increases efficiency by repeatedly reflecting any unpolarized light back, which would otherwise be absorbed by the LCD's rear polarizer. The double brightness enhanced film 214 is placed behind the liquid crystal display panel 216 without any other film in-between. The double brightness enhanced film 214 may be mounted with its transmission axis substantially parallel to the transmission axis of the rear polarizer. The double brightness enhanced film 214 helps recycle the white light 222 that would normally be absorbed by the rear polarizer (not shown) of the liquid crystal panel 216, and thus increases the brightness of the liquid crystal display panel 216.

It will be appreciated by those skilled in the art that a backlight unit according to the present invention may vary in configuration. For example, a direct lit configuration may be used, similar to the direct lit configuration shown in FIG. 1B. The prism 212 may also be removed or substituted by other brightness enhancement component in an alternative embodiment. The double brightness enhanced film 214 may be removed in another embodiment.

Unlike the conventional LCD 100, instead of using the red phosphor 110A and green phosphor 110B, remote phosphor package 206 includes particles 208A of a complex fluoride phosphor of formula I and particles 208B of a green quantum dot material. It is "remote" in the sense that the primary light source and the phosphor material are separate elements, and the phosphor material is not integrated with the primary light source as a single element. Primary light is emitted from the primary light source and is travels through one or more external media to radiationally couple the LED light source to the QD-phosphor material.

Red-emitting phosphors based on complex fluoride materials activated by $Mn^{4+}$, such as those described in U.S. Pat. Nos. 7,358,542, 7,497,973, and 7,648,649, absorb blue light strongly, and efficiently emit between about 610 nanometers and 635 nanometers with little deep red/NIR emission. The complex fluoride phosphors of formula I have a host lattice containing a coordination center, surrounded by fluoride ions acting as ligands, and charge-compensated by counter ions (A) as necessary. For example, in $K_2[SiF_6]$, the coordination center is Si and the counter ion is K. Complex fluorides are occasionally represented as a combination of simple, binary fluorides but such a representation does not indicate the coordination number for the ligands around the coordination center. The square brackets (occasionally omitted for simplicity) indicate that the complex ion they encompass is a new chemical species, different from the simple fluoride ion. The $Mn^{4+}$ dopant or activator acts as an additional coordination center, substituting a part of the coordination center, for example, Si, forming a luminescent center. The host lattice (including the counter ions) may further modify the excitation and emission properties of the activator ion.

The counter ion A in formula I is Li, Na, K, Rb, Cs, or combinations thereof, and y is 6. In certain embodiments, A is Na, K, Rb, or combinations thereof. The coordination center M in formula I is an element selected from the group consisting of Si, Ge, Ti, Zr, Hf, Sn, Al, Ga, In, Sc, Y, Bi, La, Gd, Nb, Ta, and combinations thereof. In certain embodiments, M is Si, Ge, Ti, or combinations thereof. Examples of the phosphors of formula I include $K_2[SiF_6]:Mn^{4+}$, $K_2[TiF_6]:Mn^{4+}$, $K_2[SnF_6]:Mn^{4+}$, $Cs_2[TiF_6]:Mn^{4+}$, $Rb_2[TiF_6]:Mn^{4+}$, $Cs_2[SiF_6]:Mn^{4+}$, $Rb_2[SiF_6]:Mn^{4+}$, $Na_2[TiF_6]:Mn^{4+}$, $Na_2[ZrF_6]:Mn^{4+}$, $K_3[ZrF_7]:Mn^{4+}$, $K_3[BiF_7]:Mn^{4+}$, $K_3[YF_7]:Mn^{4+}$, $K_3[LaF_7]:Mn^{4+}$, $K_3[GdF_7]:Mn^{4+}$, $K_3[NbF_7]:Mn^{4+}$, $K_3[TaF_7]:Mn^{4+}$. In certain embodiments, the phosphor of formula I is $K_2[SiF_6]:Mn^{4+}$.

QD materials for use in the remote phosphor package include at least one population of QDs capable of emitting green light upon excitation by a blue light source. The QD wavelengths and concentrations can be adjusted to meet the optical performance required. Preferred QD characteristics include high quantum efficiency (e.g., about 90% or greater), continuous and tunable emission spectrum, and narrow and sharp spectral emission, e.g., less than 40 nm, 30 nm or less, or 20 nm or less full width at half max (FWHM).

The green emitting quantum dot material may include a group II-VI compound, a group III V compound, a group IV-IV compound, a group IV compound, a group $I-III-VI_2$ compound or a mixture thereof. Non-limiting examples of group II-VI compounds include CdSe, CdTe, CdS, ZnSe, ZnTe, ZnS, HgTe, HgS, HgSe, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, HgZnSTe, or combinations thereof. Group III-V compounds may be selected from the group consisting of GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, InAlPAs, and combinations thereof. Examples of group IV compounds include Si, Ge, SiC, and SiGe. Examples of group $I-III-VI_2$ chalcopyrite-type compounds include $CuInS_2$, $CuInSe_2$, $CuGaS_2$, $CuGaSe_2$, $AgInS_2$, $AgInSe_2$, $AgGaS_2$, $AgGaSe_2$ and combinations thereof.

QDs for use in the remote package may be a core/shell QD, including a core, at least one shell coated on the core, and an outer coating including one or more ligands, preferably organic polymeric ligands. Exemplary materials for preparing core-shell QDs include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, MnS, MnSe, GeS, GeSe, GeTe, SnS, SnSe, SnTe, PbO, PbS, PbSe, PbTe, CuF, CuCl, CuBr, CuI, Si3N4, Ge3N4, Al2O3, (Al,Ga,In)2(S,Se,Te)3, Al2CO, and appropriate combinations of two or more such materials. Exemplary core-shell QDs include, but are not limited to, CdSe/ZnS, CdSe/CdS, CdSe/CdS/ZnS, CdSeZn/CdS/ZnS, CdSeZn/ZnS, InP/ZnS, PbSe/PbS, PbSe/PbS, CdTe/CdS and CdTe/ZnS.

The QD materials typically include ligands conjugated to, cooperated with, associated with, or attached to their surface. In particular, the QDs may include a coating layer comprising ligands to protect the QDs from environmental conditions including elevated temperatures, high intensity light, external gasses, and moisture, control aggregation, and allow for dispersion of the QDs in the matrix material.

In some embodiments, a remote phosphor package according to the present invention may contain a narrow green emitting phosphor material instead of or in addition to a quantum dot material. Examples of suitable green emitting phosphors include CdS:In, $SrGa_2S_4:Eu$, $CaSO_4:Bi$, SrS:Mn, ZnS:Eu, and $CaGa_2S_4:Eu$.

The remote phosphor package material additionally includes a matrix material in which the QD-phosphor material is embedded or otherwise disposed. Suitable matrix materials are transparent, non-yellowing, and chemically and optically compatible with the backlight unit components, including the QDs and any surrounding packaging materials or layers. Preferred matrix materials have low oxygen and moisture permeability, exhibit high photo- and chemical-stability, exhibit favorable refractive indices, and adhere to the barrier or other layers adjacent the QD phosphor material, thus providing an air-tight seal to protect the QD-phosphor material.

Examples of matrix materials for use in QD phosphor material of the present invention include epoxies, acrylates, norborene, polyethylene, poly(vinyl butyral):poly(vinyl acetate), polyurea, polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are crosslinked with difunctional monomers, such as divinylbenzene; cross-linkers suitable for cross-linking ligand materials, epoxides which combine with ligand amines (e.g., APS or PEI ligand amines) to form epoxy polymers.

Figure 3:
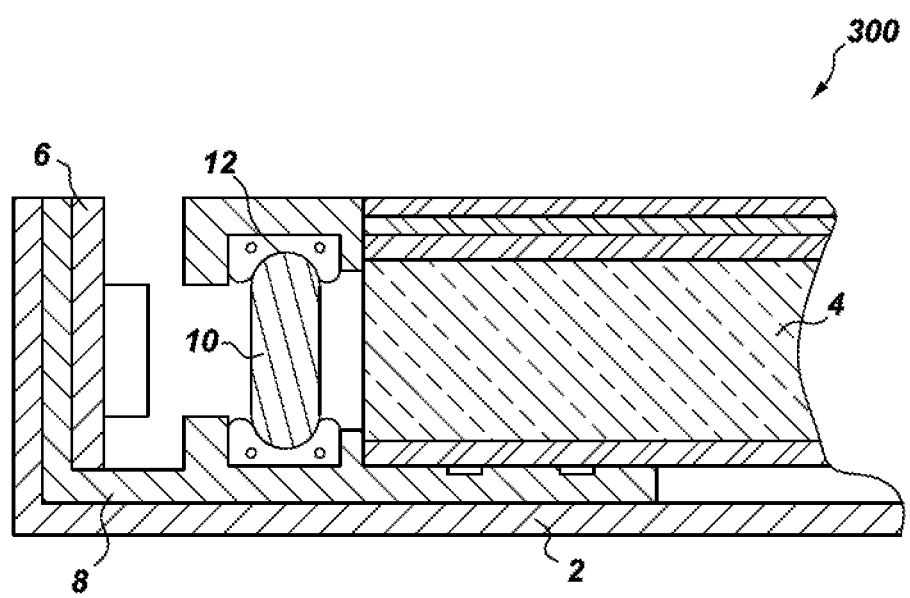
FIG. 3 illustrates backlight unit according to the present invention.

Referring to FIG. 3, backlight unit 300 according to the present invention includes backplane 2, light guide panel 4, LED light source 6, mounting bracket 8, and a remote phosphor package in the form of a strip 10, mounted in the backplane 2. The remote phosphor package 10 is mounted via mounting bracket 8 between light guide panel 4 and LED light source 6, whereby light emitting from the backlight source 6 is transmitted through composite material 10 and then enters the light guide plate 4. The backlight unit may further include a bottom reflector plate 14 arranged between light guide panel 4 and the backplane 2 and an optical film assembly 16 arranged above the light guide plate 4.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A backlight unit comprising an LED light source, a remote phosphor package radiationally coupled to an LED light source, a Liquid Crystal Display (LCD) panel, and a brightness enhanced film disposed between the LCD panel and the remote phosphor package; the remote phosphor package comprising a green emitting quantum dot material and a $Mn^{4+}$ doped phosphor of formula I, dispersed in a host matrix, and a green emitting phosphor material which does not include the green emitting quantum dot material, wherein the backlight unit is in the absence of a light guide panel, wherein the green emitting quantum dot material comprises a core, at least one shell coated on the core and an outer coating layer comprising ligands, $$A_x[MF_y]:Mn^{4+} \qquad I$$

wherein
A is Li, Na, K, Rb, Cs, or combinations thereof;
M is Si, Ge, Sn, Ti, Zr, Al, Ga, In, Sc, Y, La, Nb, Ta, Bi Gd, or combinations thereof;
x is an absolute value of a charge of the $[MF_y]$ ion; and
y is 5, 6 or 7.

2. The backlight unit of claim 1, wherein the backlight unit is in a direct lit backlight unit configuration.

3. The backlight unit of claim 1, wherein the light emitted by the LED light source travels through one or more media external to the remote phosphor package to radiationally couple the LED light source to the remote phosphor package.

4. The backlight unit of claim 1, wherein the LED light source is directly arranged to provide light to a diffuser plate.

5. The backlight unit of claim 4, wherein the diffuser plate supports a diffuser film.

6. The backlight unit of claim 1, wherein the color stable $Mn^{4+}$ doped phosphor is $K_2SiF_6:Mn^{4+}$.

7. The backlight unit of claim 1, wherein the quantum dot material comprises CdSe or InP.

8. An electronic device comprising a backlight unit according to claim 1.

9. A display device comprising a backlight unit according to claim 1.

10. A mobile display device comprising a backlight unit according to claim 1.

11. A backlight unit comprising a device, the device comprising an LED light source being in communication with a Liquid Crystal Display (LCD) panel, the LED light source being radiationally coupled to a package comprising a green emitting quantum dot material, a green emitting phosphor material which does not include the green emitting quantum dot material, and a $Mn^{4+}$ doped phosphor of formula I, $$A_x[MF_y]:Mn^{4+} \qquad I$$

the green emitting quantum dot material comprising a group II-VI compound, a group III-V compound, a group IV compound, a group I-III-$VI_2$ compound of or a mixture thereof, wherein the green emitting quantum dot material comprises a core, at least one shell coated on the core and an outer coating layer comprising ligands;
wherein the backlight unit is in the absence of a light guide panel; and
wherein
A is Li, Na, K, Rb, Cs, or combinations thereof;
M is Si, Ge, Sn, Ti, Zr, Al, Ga, In, Sc, Y, La, Nb, Ta, Bi Gd, or combinations thereof;
x is an absolute value of a charge of the $[MF_y]$ ion;
y is 5, 6 or 7
a brightness enhanced film being disposed between the LCD panel and the package.

12. The backlight unit of claim 11, wherein the color stable $Mn^{4+}$ doped phosphor is $K_2SiF_6:Mn^{4+}$.

13. The backlight unit of claim 11, wherein the quantum dot material comprises CdSe or InP.

14. An electronic device comprising a backlight unit according to claim 11.

15. A display device comprising a backlight unit according to claim 11.

16. A mobile display device comprising a backlight unit according to claim 11.

17. The backlight unit of claim 1, wherein the core and the at least one shell of the green quantum dot material comprise PbSe/PbS.

18. The backlight unit of claim 1, wherein the green emitting quantum dot material has a quantum efficiency greater than 90%.

19. The backlight unit of claim 11, wherein the core and the at least one shell of the green quantum dot material comprise PbSe/PbS.

20. The backlight unit of claim 11, wherein the green emitting quantum dot material has a quantum efficiency greater than 90%.

* * * * *